United States Patent [19]

Bourgeous et al.

[11] 4,232,883
[45] Nov. 11, 1980

[54] COUNTERWEIGHT ASSEMBLY FOR A VEHICLE

[75] Inventors: Clarence G. Bourgeous, Mt. Clemens; Oliver G. Miller, Taylor, both of Mich.

[73] Assignee: Ford Motor Company, Dearborn, Mich.

[21] Appl. No.: 21,938

[22] Filed: Mar. 19, 1979

[51] Int. Cl.³ ............................ B62D 37/00; B60K 5/02
[52] U.S. Cl. .................................. 280/759; 180/291; 180/312
[58] Field of Search ............... 280/759, 755, 757, 756; 212/49, 48; 414/673, 719; 293/117; 180/312, 291, 54 D, 900

[56] References Cited

U.S. PATENT DOCUMENTS

| | | | |
|---|---|---|---|
| 2,701,728 | 2/1955 | Miller | 280/759 |
| 2,967,718 | 1/1961 | Orwig | 280/759 |
| 3,032,352 | 5/1962 | Barett | 280/759 |
| 3,061,034 | 10/1962 | Hoyt | 280/759 |
| 3,270,829 | 9/1966 | Steiger et al. | 180/900 |
| 3,490,787 | 1/1970 | Latterman et al. | 280/759 |
| 3,853,231 | 12/1974 | Luttrell | 280/759 |

*Primary Examiner*—David M. Mitchell
*Attorney, Agent, or Firm*—John J. Roethel; Clifford L. Sadler

[57] ABSTRACT

A counterweight assembly for a vehicle comprising an open-end support frame anchored to the vehicle chassis and extending longitudinally from the latter beneath the overhang of an engine supported on one end of the chassis. A plurality of weights 21 are suspended from the support frame. Co-acting means 25–26 on the support frame and the weights 21 provide for self-alignment of the weights upon insertion of the latter through the open end into the support frame. The co-acting means are constructed and arranged to provide line contact between portions of the support frame and each weight to minimize sliding resistance as the weights are moved in the direction of the chassis toward locating stop means 31. Securing means 28 lock the weights in place on the support frame.

3 Claims, 3 Drawing Figures

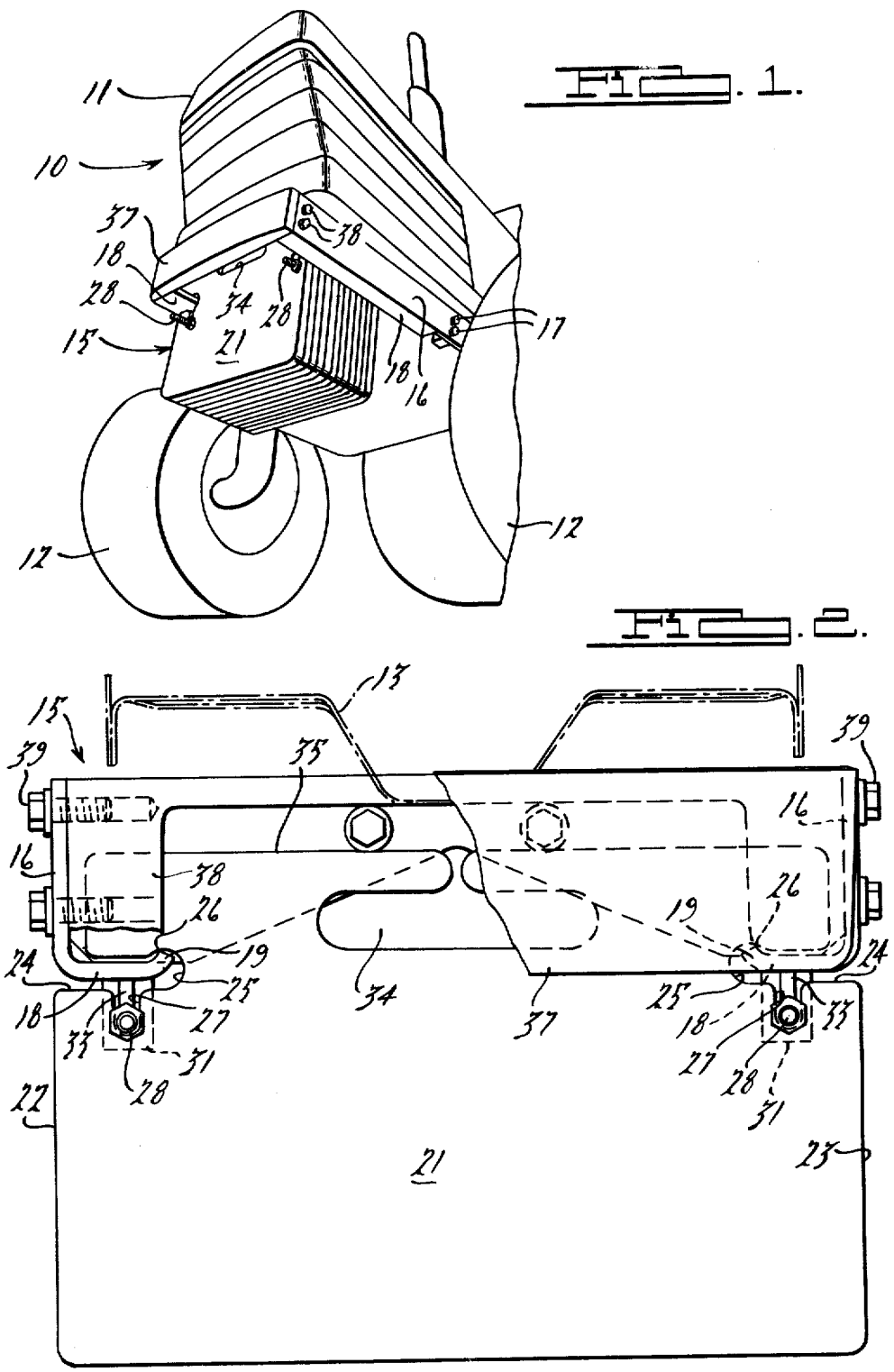

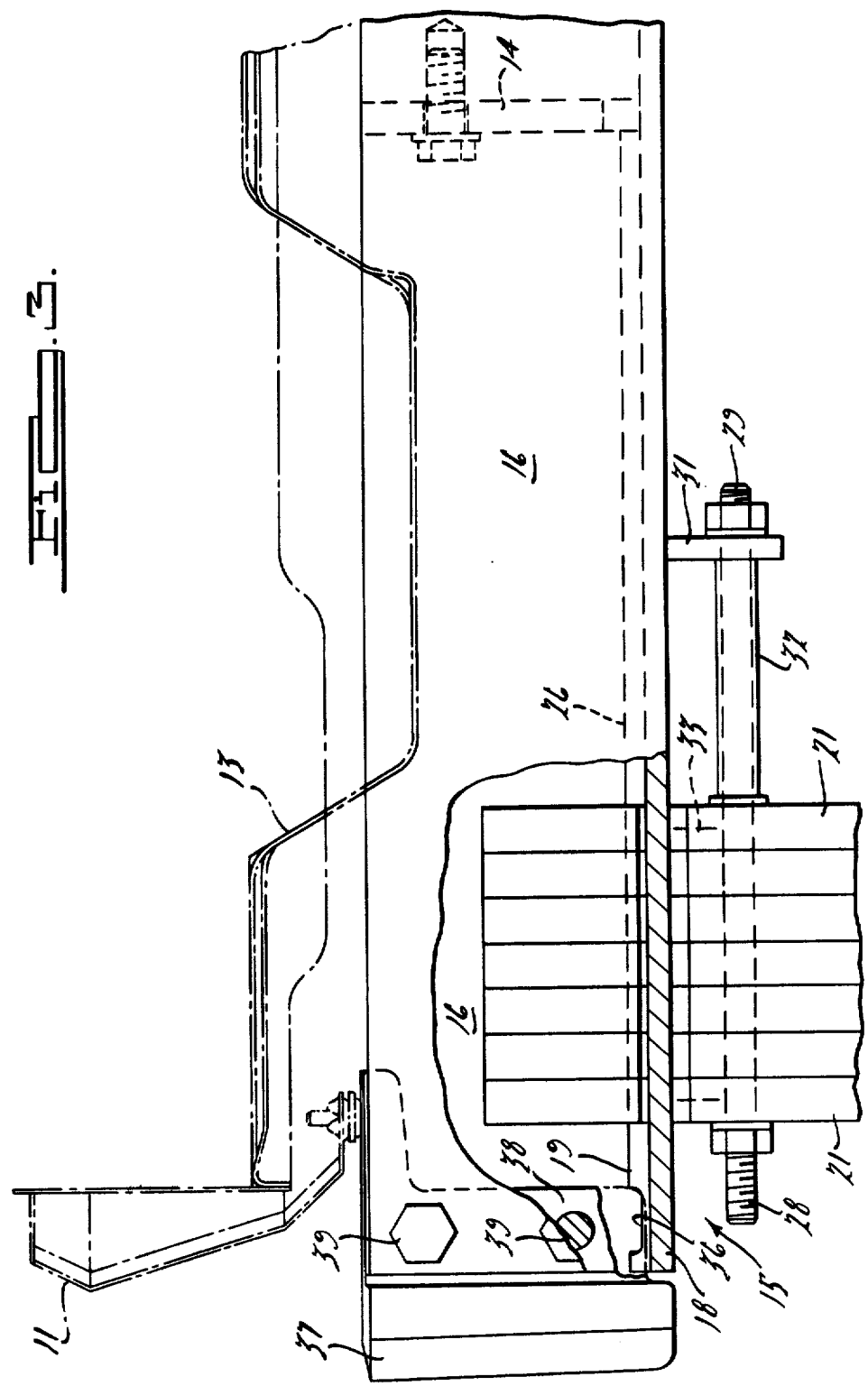

COUNTERWEIGHT ASSEMBLY FOR A VEHICLE

BACKGROUND OF THE INVENTION

As explained in some detail in U.S. Pat. No. 2,701,728 issued Feb. 8, 1955 to Raymond J. Miller for a "Weight Selection Device for Stabilizing Tractors"; and U.S. Pat. No. 3,032,352 issued May 1, 1962 to Robert D. Barrett for a "Tractor Vehicle Weighting Means", it is a well known fact that the tractive effort of the tractor is limited by the weight distribution of the tractor. In Column 1, lines 44 et. seq. of the Miller patent, it is stated: "When the tractor is utilized to pull a very heavy load by a trailing draw bar, the traction forces inherently involved produce a transfer of weight from the front wheels of the tractor to the rear wheels, which weight transfer can eventually result in the front end of the tractor raising off the ground. Accordingly, when adding weight to a tractor to increase tractive effort, it is quite desirable that a substantial proportion of the added weight be located near the front extremities of the tractor; . . . "

A recently developed class of heavy duty tractors is characterized by a configuration in which the engine is supported on a chassis with a substantial portion of the engine overhanging one end of the chassis. In a farm tractor, the engine would overhang the front end of the chassis since the various earth working implements are usually coupled to the rear end of the chassis; on shovel loaders or fork lift tractors in which the shovel or lift fork are at the front of the tractor, the engine would be at the rear.

It is an object of the present invention to use the space beneath the engine overhang for conveniently mounting the counterweights. Further, the counterweight assembly is constructed and arranged so that the total mass of the counterweights may be easily and conveniently varied to provide adequate tractive effort for heavy duty operations, while permiting more efficient tractor operations on the lighter duty operations.

SUMMARY OF THE INVENTION

The present invention relates to a counterweight assembly for a vehicle having its engine supported on a chassis with a substantial portion of the engine overhanging one end of the chassis. The counterweight assembly comprises an open end support frame anchored to the chassis and extending longitudinally from the latter beneath the overhang of the engine. A plurality of weights are suspended from the support frame. The coacting means are constructed and arranged to provide line contact between portions of the support frame and each weight to minimize sliding resistance as the weights are moved in the direction of the chassis toward locating stop means. A securing means locks the weights in place on the support frame.

DESCRIPTION OF THE DRAWINGS

Other objects, advantages and features of the present invention will become more apparent as the description proceeds; reference being had to the accompanying drawings wherein:

FIG. 1 is a perspective view of the front end of a tractor having a counterweight assembly mounted beneath the engine overhang as embodied in the present invention;

FIG. 2 is a front elevational view of the counterweight assembly of FIG. 1; and

FIG. 3 is a side elevational view, in part fragmentary, of the counterweight assembly.

DETAILED DESCRIPTION OF THE INVENTION

Referring now to the drawings, there is illustrated in FIG. 1 the front end of a tractor, generally designated 10, of the type in which the engine, concealed within the housing 11, has a substantial portion projecting forwardly of the front wheels 12. In FIG. 3, the engine is represented in dot-and-dash outline by its oil pan 13. The engine has a substantial portion projecting forwardly of the vehicle chassis, the front end of which is represented by the dotted line 14.

The counterweight assembly, generally designated 15, embodying the present invention comprises and open-end support frame that is anchored to the vehicle chassis and extends longitudinally from the latter beneath the overhang of the engine. The support frame comprises a pair of parallel side rails 16 that are bolted to the chassis side members (not shown) at the opposite longitudinal sides of the chassis. A pair of the bolts 17 are visible in FIG. 1 just forward of the wheel 12, and it will be understood that additional bolts to the rear of the visible pair of used to further bolt the side rails to the chassis. Forwardly of the visible pair of bolts 17, the side rails 16 of the support frame each have an inwardly turned flange 18 that extends to the front end of each side rail 16. Each flange terminates in an upwardly inclined track portion 19, best seen in FIG. 2.

The weights used in the counterweight assembly comprise metal slabs 21 of generally rectangular shape. Each slab weighs about 100 pounds (45.36 kilograms). The slabs 21 preferably are used in combinations of twelve, as shown in FIG. 1, or seven, as shown in FIG. 3, although it will be understood that any number less than twelve may be used, if desired, to meet the loading requirements. The variable number of slabs may be accommodated by substituting suitable spacers for any number of the slabs in a manner to be described.

The slabs 21 are adapted to be suspended from the side rails 16. The opposite sides 22-23 of each slab 21 become the vertical sides when the slabs are suspended from the rails 16, as best seen in FIG. 2. Each slab 21 has a horizontal slot 24 extending inwardly from each of its vertical edges 22-23. Each slot 24 terminates in a contoured, preferably semi-circular, pocket 25. The vertical width of each slot 24 is designed to easily accommodate the flange 18 of the respective side rails 16 with the upper curved wall surface of the pocket 25 in tangential engagement with the uppermost edge 26 of the terminal track portion 19 on each flange 18.

Each horizontal slot 24 in a weight or slab 21 communicates with a vertical slot or recess 27, the slot or recess 27 depending from the bottom wall of the slot 24. The weights or slabs 21 are retained on the flange 18 of the side rails 16 by elongated key bolts 28 that project through the slots or recesses 27. As best seen in FIG. 3, each key bolt 28 extends in spaced horizontal relationship to the flange 18 on each side rail and is anchored at its inboard end 29 in a depending stop member 31 secured to the underside of the rail flange 18.

In the event that only seven weights or slabs 21 are used, as shown in FIG. 3, a tubular sleeve or spacer 32 may be slipped over the inboard of the key bolt 28 in position to be interposed between the weights and the locating stop member 31. If the full twelve slabs 21 are to be used, the spacer 32 may be eliminated. Obviously, the length of the spacer 32 may be shorter or longer than that shown in FIG. 3 as needed to accommodate any other combination of weights or slabs 21.

The key bolt 28 is so-called because it has welded thereon an elongated key 33 of substantially rectangular cross-section. The key fills the gap between each bolt and the underside of each rail flange 18. The construction and arrangement of the key bolt 28, and the relationship of the latter to the weights or slab 21 and the rail flanges 18 in installed position, renders the key bolts effective to provide horizontal and vertical restraints on the weights or slabs 21 when the latter are suspended from the side rails 16.

Each weight or slab 21 has a substantially oval-shaped cutout 34 below its upper edge 35. This cutout serves as a hand grip to assist in the placement of the slabs on the support rails 16.

Each support rail has a notch 36 in the tract portion 19 of each rail flange 18. The purpose of the notch is to capture the weights, one by one, as they are slid to the open end of the support frame. This prevents the weights or slabs 21 from suddenly falling off the rails while the weights are being unloaded. Before the weights or slabs 21 can be removed from the rail 16, each one must be deliberately lifted out of or over the notches 36.

Although the weight support frame is considered open-ended at its front end for the loading or unloading of the weights or slabs 21, provision is made for the placement of a cast front weight cap 37 to close the front end of the support frame after the weights have been locked in place. The weight cap has a projecting portion 38 adapted to be inserted between the side rails 16 and to receive bolts 39 for holding the weight cap in place.

The weights or slabs 21 are installed beneath the overhang of the tractor engine after removable of the front weight cap 37. To place the weights or slabs 21 on the support frame, it is necessary that each weight be lifted to a level in which the slots 24 on each side of each slab 21 is in horizontal alignment with the flange 18 on each support rail 16. The weights must be maintained at this level until they pass over the notches 36 in the track portions 19 of each support rail flange 18.

Once the notches 36 have been passed, the lifting effort on the slabs 21 may be relieved. At this point, the upper surface of each pocket 25 at the inner ends of the slots 24 will tangentially engage the track portion edge 26. The relationship between the track portion 19 and the weights or slabs 21 provides a self-alignment feature which lines the weights up as they are installed and slid rearwardly against the locating stop 31 or against the spacer 32 if the latter is in place. The line contact between the rail and the weights results in a low sliding resistance between the rail and the weights and allows the weights to be moved back and forth with relative ease.

It is to be understood that this invention is not limited to the exact construction illustrated and described above, but that various changes and modifications may be made without departing from the spirit and scope of the invention as defined in the appended claims.

We claim:

1. A counterweight assembly for a vehicle having its engine supported on a chassis with a substantial portion of the engine overhanging one end of the chassis;

the counterweight assembly comprising an open-end support frame anchored to the chassis and extending longitudinally from the latter beneath the overhang of the engine;

the support frame having parallel side rails located on opposite sides of the chassis;

and each side rail at the bottom thereof having an inwardly turned flange terminating in an upwardly inclined track portion;

a plurality of weights suspended from the support frame;

each weight having a slot opening inwardly from each vertical edge to receive a rail flange;

each slot terminating in a wall portion contoured for substantially tangential contact with an edge of the inclined track portion of the side rail flange received in the slot;

the inclined track portions on the support frame flanges and the contoured wall portion of each slot in the weights co-acting to cause self-alignment of the weights with each other upon insertion of the weights into the support frame through the open end thereof and to minimize sliding resistance as the weights are moved in the direction of the chassis toward locating stop means;

and securing means locking the weights in place on the support frame.

2. A counterweight assembly according to claim 1, in which:

adjacent the open end of the support frame each side rail has a notch extending downwardly from its inclined track portion;

the notches being positioned to engage edge portions of the weight to limit movement of the latter away from the locating stop means along the inclined track portion.

3. A counterweight assembly according to claim 1, in which:

each slot has a vertically depending recess extending from its bottom wall;

and the securing means comprise a key bolt extending through the weights in engagement with the bottom of the recess;

each key bolt having an upstanding key portion engaged with the bottom of the adjacent rail flange intermediate the ends of the latter;

the key bolts providing horizontal and vertical restraints on the weights.

* * * * *